US011281072B1

(12) United States Patent
Nayar et al.

(10) Patent No.: US 11,281,072 B1
(45) Date of Patent: Mar. 22, 2022

(54) APPARATUS HAVING A VIEWFINDER MIRROR CONFIGURATION

(71) Applicant: Snap Inc., Santa Monica, CA (US)

(72) Inventors: Shree K. Nayar, New York, NY (US); Jian Wang, Long Island City, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/915,691

(22) Filed: Jun. 29, 2020

Related U.S. Application Data

(60) Provisional application No. 62/868,696, filed on Jun. 28, 2019.

(51) Int. Cl.
  *G03B 13/06* (2021.01)
  *H04B 1/3888* (2015.01)
(52) U.S. Cl.
  CPC ........... *G03B 13/06* (2013.01); *H04B 1/3888* (2013.01)
(58) Field of Classification Search
  CPC ........ G03B 13/02; G03B 13/06; G02B 23/14; H04B 1/3888
  See application file for complete search history.

(56) References Cited

U.S. PATENT DOCUMENTS

| 5,537,175 A * | 7/1996 | Kamaya ................. G03B 17/38 396/376 |
| 6,496,657 B2 * | 12/2002 | Aizawa .................. G03B 13/02 396/103 |
| 2018/0152550 A1 * | 5/2018 | Dharmatilleke ... H04N 5/23245 |
| 2018/0227401 A1 * | 8/2018 | DiLaura .............. H04M 1/0254 |
| 2018/0338027 A1 * | 11/2018 | Sung .................. H04N 5/2257 |
| 2020/0192190 A1 * | 6/2020 | Dwyer .................. G03B 13/06 |

FOREIGN PATENT DOCUMENTS

| GB | 2238881 A * | 6/1991 | ............... G02B 3/00 |
| JP | 2003333148 A * | 11/2003 | |

* cited by examiner

*Primary Examiner* — Christopher E Mahoney
(74) *Attorney, Agent, or Firm* — Schwegman Lundberg & Woessner, P.A.

(57) ABSTRACT

An apparatus that comprises a camera opening that couples to a camera lens of a camera and a viewfinder collocated with the camera opening. The viewfinder comprises a mirror coupled to an aperture having a width and a height. The mirror is recessed into the apparatus at a depth defined by a height of the aperture. The width and the height of the aperture being based on a field of view of the camera. The viewfinder having a field of view that approximates the field of view of the camera for a range of viewing angles. Other embodiments are described herein.

19 Claims, 6 Drawing Sheets

APPARATUS HAVING A VIEWFINDER MIRROR CONFIGURATION

CROSS REFERENCED TO RELATED APPLICATIONS

This application claims the benefit of priority to U.S. Provisional Patent Application Ser. No. 62/868,696, filed Jun. 28, 2019, the contents of which are incorporated herein by reference in their entirety.

BACKGROUND

Currently, a number of consumer electronic devices are adapted to capture image, audio as well as video content. The electronic devices, such as mobile devices, are now generally equipped with a rear-facing camera. When a user takes a picture with his mobile device, the display screen of the mobile device can generate a preview of the picture for the user to view. The preview of the picture shows the field of view of the camera and the resultant picture that can be captured given that field of view.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Embodiments of the disclosure can provide an improvement to the electronic consumer devices that are equipped with rear-facing camera by providing the user with a preview of a picture taken in self-portrait mode using the rear-facing camera. In other words, when the user wants to take a picture of himself using the rear-facing camera, in some embodiments, an apparatus having a viewfinder enables the user to preview of the picture. The viewfinder comprises a mirror that can be convex and an aperture. The viewfinder is configured to provides us with a field of view (FOV) that changes based on the changes in the viewing angle. Within a range of viewing angles, the FOV through the mirror can be almost constant.

Figure 1:
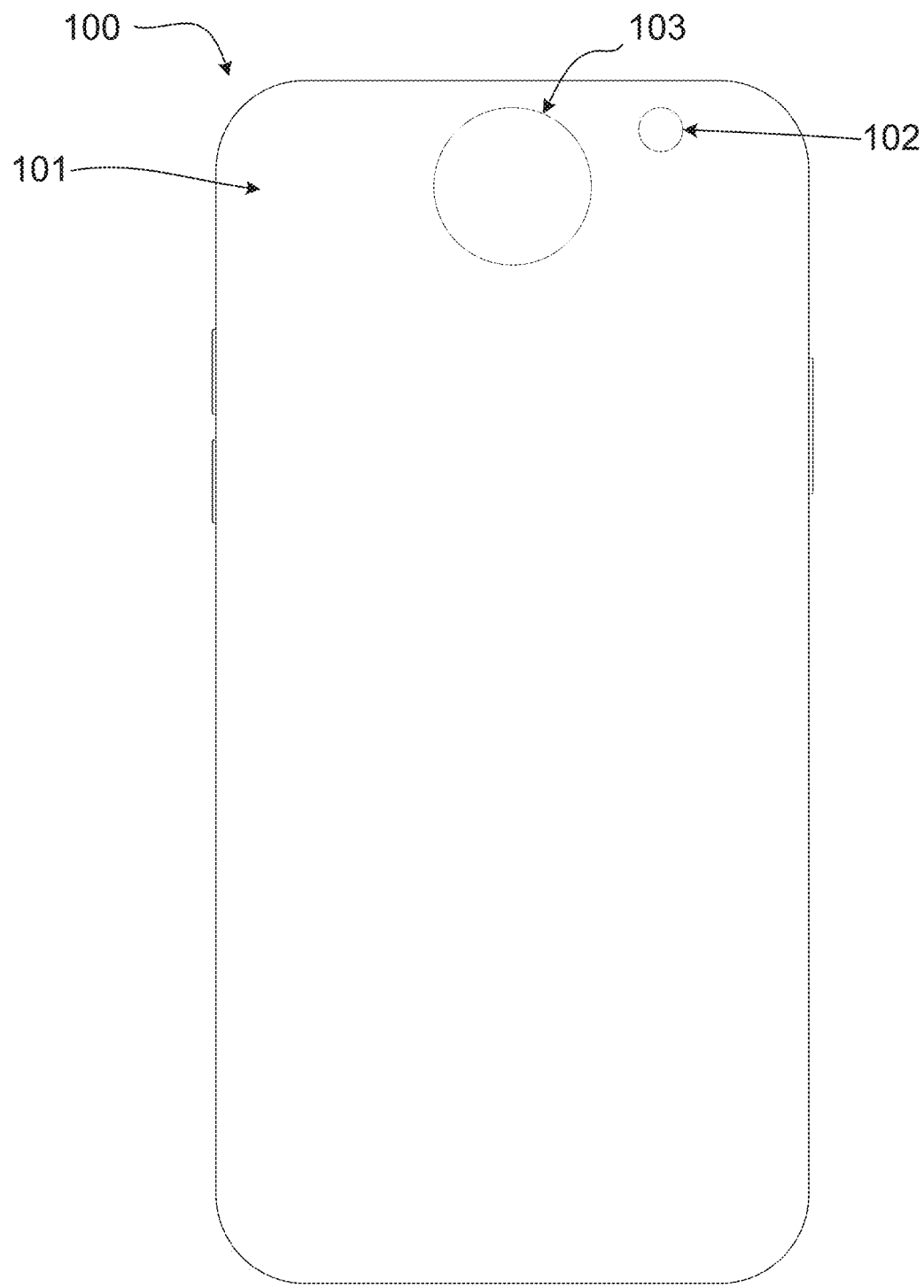
FIG. 1 is an example of an apparatus having a viewfinder according to one example embodiment.
Figure 4:
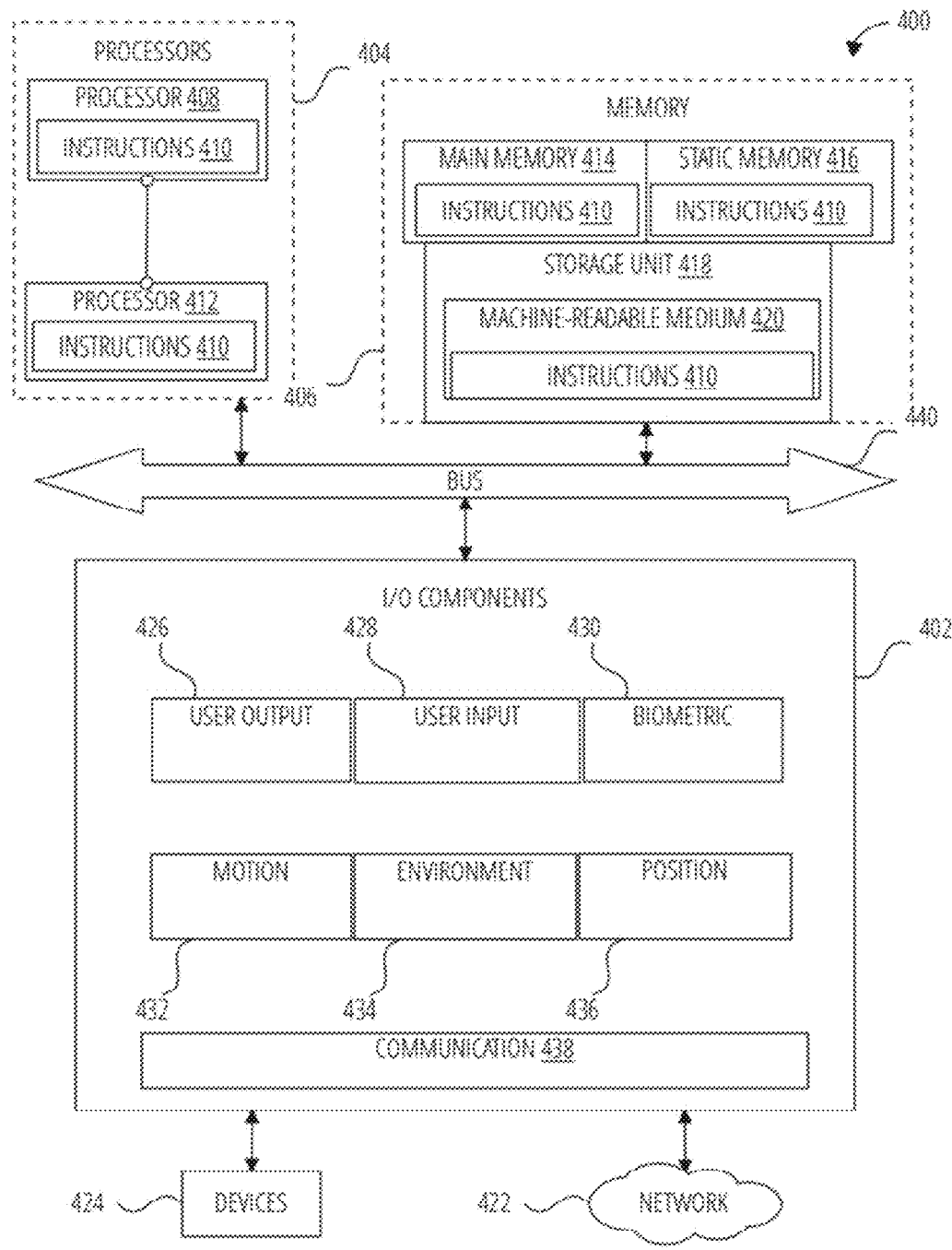
FIG. 4 is a diagrammatic representation of a machine in the form of a computer system within which a set of instructions may be executed for causing the machine to perform any one or more of the methodologies discussed herein, in accordance with some examples.

FIG. 1 is an example of an apparatus having a viewfinder according to one example embodiment. The apparatus 100 in FIG. 1 is shown to be a housing case that can be coupled to a client device (e.g., mobile device) having a camera. However, it is understood that, in other embodiments, the apparatus 100 is any client device having a camera such as the mobile device. For example, the client device can be the machine 400 as illustrated in FIG. 4. In another embodiment, the apparatus 100 can be a housing case that also comprises a camera that is separate from the client device.

Some embodiments may include one or more wearable devices, such as a pendant with an integrated camera that is integrated with, in communication with, or coupled to, a client device. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, or any other wearable devices.

As shown in FIG. 1, the apparatus 100 includes a housing 101, a camera opening 102, and a viewfinder 103. In one embodiment, the housing 101 is shaped to be coupled to an electronic device having a camera. In another embodiment, the housing 101 is the housing of the electronic device having the camera.

The camera opening 102 is an opening in the housing 101 that couples to a camera lens of a camera. In one embodiment, the camera opening can be a window allowing the camera lens to capture image or video content. The camera can include the camera lens and an image sensor. The camera lens may be a perspective camera lens or a non-perspective camera lens. A non-perspective camera lens may be, for example, a fisheye lens, a wide-angle lens, an omnidirectional lens, etc. The image sensor captures digital video through the camera lens. The images may also be still image frames or a video including a plurality of still image frames.

The viewfinder 103 is collocated with the camera opening 102. In one embodiment, the viewfinder 103 is located adjacent to the camera opening 102. In FIG. 1, the viewfinder 103 is level with the camera opening 102 and located to the left of the camera opening 102. In one embodiment, the viewfinder 103 can be larger in size than the camera opening 102.

Figure 2A:
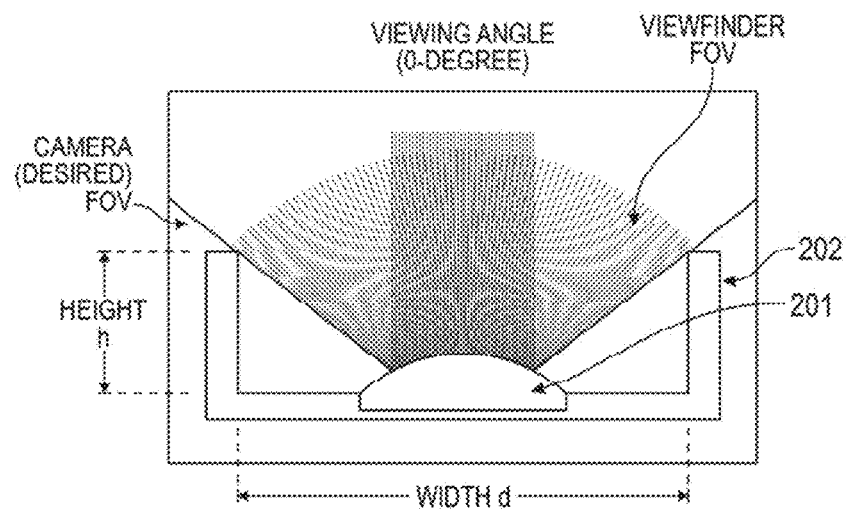
FIGS. 2A-2C are block diagrams illustrating further details of the viewfinder from FIG. 1, according to one example embodiment.
Figure 2B:
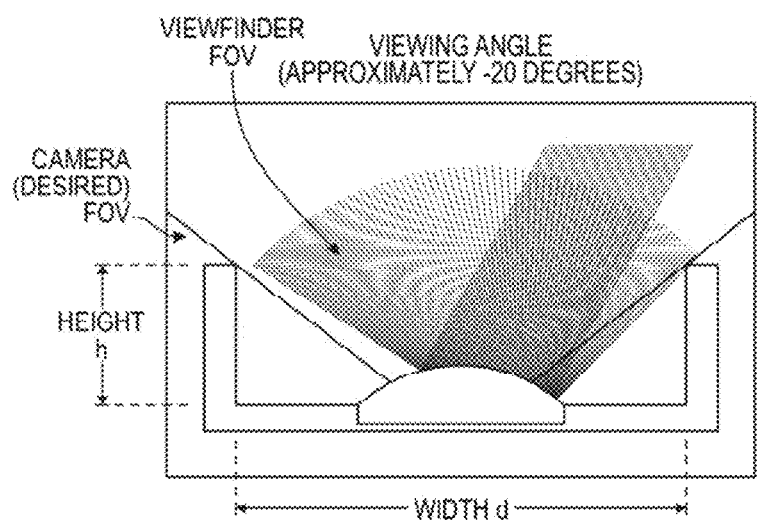
Figure 2C:
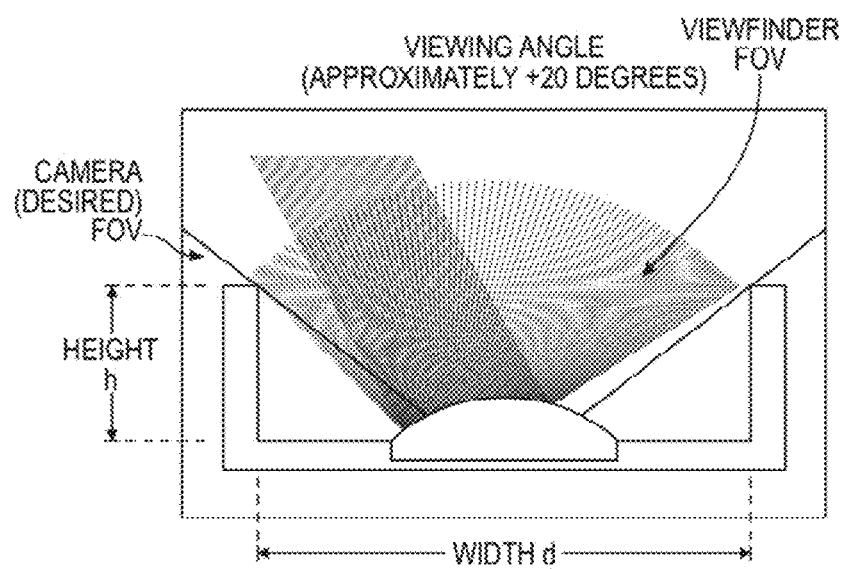

FIGS. 2A-2C are block diagrams illustrating further details of the viewfinder 103 from FIG. 1, according to one example embodiment. As shown in FIG. 2A, the viewfinder 103 includes a mirror 201 and an aperture 202. The mirror 201 is coupled to the inside of the aperture 202. The shape of the mirror can be convex such as spherical, parabolic, hyperbolic, or can be defined by a higher number polynomial.

The aperture 202 can be made of plastic, wood, metal, etc. The dimensions of aperture 202 include a width d and a height h, as shown in FIGS. 2A-2C. The mirror 201 is recessed into the apparatus 100 at a depth defined by the height h of the aperture 202. The width d and the height h of the aperture 202 are based on the field of view of the camera. In FIGS. 2A-2C, the field of view of the camera is illustrated and is the desired field of view for the viewfinder 103. The parameters such as the size and shape of the mirror 201 and the height h and width d of the aperture 202 are defined to ensure that the viewfinder 103 has a field of view that approximates the field of view of the camera for a range of viewing angles. FIG. 2A illustrates the field of view of the viewfinder 103 at a 0-degree viewing angle. FIGS. 2B-2C illustrate the field of view of the viewfinder 103 at a viewing angle of approximately −20 degrees and +20 degrees, respectively.

Other parameters that can be considered to reduce the error metric between the field of view of the viewfinder 103 and the field of view of the camera can include, for example, the half angle of the viewer, the camera field of view, the radius of the circular part of the mirror, and the dimension of the mirror. In other embodiments, other parameters to reduce the error metric can be the size of the mirror, the radius of the mirror, and the curvature of the mirror. In some embodiments, difference in pixels between the captured image and reflected image in the viewfinder 103 can be used to optimize the parameters of the mirror 201 and the aperture 202.

Figure 3:
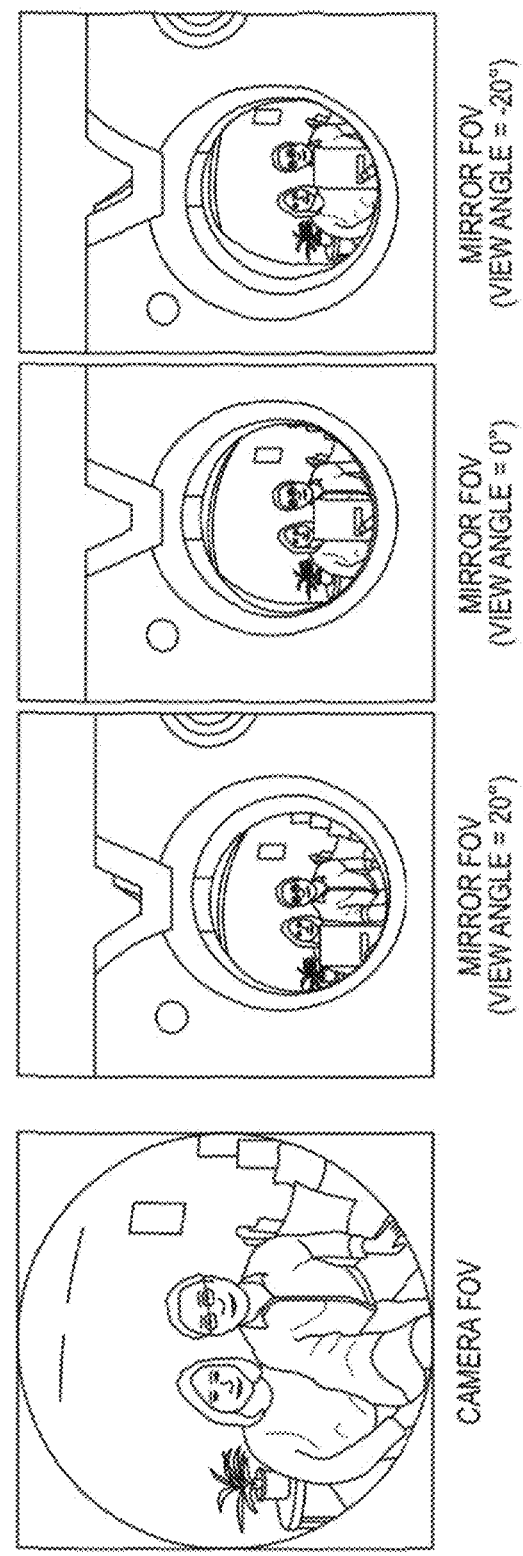
FIG. 3 illustrate examples of the field of view of the camera and the field of view of the viewfinder at different viewing angles according to an embodiment of the present invention.

FIG. 3 illustrate examples of the field of view (FOV) of the camera and the field of view (FOV) of the viewfinder at different viewing angles according to an embodiment of the present invention. In FIG. 3, the field of view (FOV) of the camera when the user directly facing the camera (e.g., center view point or at a 0-degree angle) is illustrated. The field of view of the viewfinder 103 is also illustrated at a user's viewing angle of 20 degrees, 0 degree, and −20 degrees. The viewing angle of 20 degrees is obtained when the user is viewing the viewfinder 103 at 20 degrees to the right from the center view point or 0-degree angle. The viewing angle of −20 degrees is obtained when the user is viewing the viewfinder 103 at 20 degrees to the left from the center view point or 0-degree angle.

The image that is reflected in the viewfinder 103 for the user to view is a preview of the image seen by the camera at the user's viewing angle. The image that is reflected in the viewfinder 103 can be the field of view of the viewfinder 103. Accordingly, as shown in FIG. 3, the viewfinder 103 has a field of view that approximates the field of view of the camera for a range of viewing angles. The range of viewing angles is a range of angles at which a user can view the mirror 201 in the aperture 202. The range of viewing angles can also be a range of angles at which the user can view the mirror 201 while holding the apparatus 100.

As shown in FIG. 3, the aperture 202 limits the range of viewing angles and prevents the mirror from reflecting at given angles. In other words, the field of view of the viewfinder is based on the height h and the width d of the aperture 202. Accordingly, the dimensions and the shape of the aperture 202 and the mirror 201 allows the viewfinder 103 to have a field of view that approximates the field of view of the camera.

In one embodiment, the range of viewing angles comprises up to 30 degrees in each direction from a center viewpoint of the mirror. In one embodiment, the viewing angles can include viewing angles between −30 degrees to 30 degrees, inclusively. The viewing angles can also be between −30 degrees to 30 degrees, inclusively, in any direction from the center viewpoint (e.g., 0-degree angle).

In one embodiment, the apparatus having a viewfinder 103 also have applications that are independent of a camera. For example, the apparatus can be implemented as a sideview or rear-view mirror in a vehicle. The height h and width d of the aperture as well as the size of the mirror are optimized such that the reflected field of view of the viewfinder approximates the optimal side view area of the vehicle or the optimal rear-view area of the car.

Machine Architecture

FIG. 4 is a diagrammatic representation of the machine 400 within which instructions 410 (e.g., software, a program, an application, an applet, an app, or other executable code) for causing the machine 400 to perform any one or more of the methodologies discussed herein may be executed. For example, the instructions 410 may cause the machine 400 to execute any one or more of the methods described herein. The instructions 410 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein. The machine 400, for example, may comprise the client device or any one of a number of server devices forming part of a messaging server system. In some examples, the machine 400 may also comprise both client and server systems, with certain operations of a particular method or algorithm being performed on the server-side and with certain operations of the particular method or algorithm being performed on the client-side.

The machine 400 may include processors 404, memory 406, and input/output I/O components 638, which may be configured to communicate with each other via a bus 440. In an example, the processors 404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 408 and a processor 412 that execute the instructions 410. The term "processor" is intended to include multi-core processors that may comprise two or more independent processors (sometimes referred to as "cores") that may execute instructions contemporaneously. Although FIG. 4 shows multiple processors 404, the machine 400 may include a single processor with a single-core, a single processor with multiple cores (e.g., a multi-core processor), multiple processors with a single core, multiple processors with multiples cores, or any combination thereof.

The memory 406 includes a main memory 414, a static memory 416, and a storage unit 418, both accessible to the processors 404 via the bus 440. The main memory 406, the static memory 416, and storage unit 418 store the instructions 410 embodying any one or more of the methodologies or functions described herein. The instructions 410 may also reside, completely or partially, within the main memory 414, within the static memory 416, within machine-readable medium 420 within the storage unit 418, within at least one of the processors 404 (e.g., within the Processor's cache memory), or any suitable combination thereof, during execution thereof by the machine 400.

The I/O components 402 may include a wide variety of components to receive input, provide output, produce output, transmit information, exchange information, capture measurements, and so on. The specific I/O components 402 that are included in a particular machine will depend on the type of machine. For example, portable machines such as mobile phones may include a touch input device or other such input mechanisms, while a headless server machine will likely not include such a touch input device. It will be appreciated that the I/O components 402 may include many other components that are not shown in FIG. 4. In various examples, the I/O components 402 may include user output components 426 and user input components 428. The user output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 402 may include biometric components 430, motion components 432, environmental components 434, or position components 436, among a wide array of other components. For example, the biometric components 430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 432 include acceleration sensor components (e.g., accelerometer), gravitation sensor components, rotation sensor components (e.g., gyroscope).

The environmental components 434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device may have a camera system comprising, for example, front cameras on a front surface of the client device and rear cameras on a rear surface of the client device. The front cameras may, for example, be used to capture still images and video of a user of the client device (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device may also include a 360° camera for capturing 3600 photographs and videos.

Further, the camera system of a client device may include dual rear cameras (e.g., a primary camera as well as a depth-sensing camera), or even triple, quad or penta rear camera configurations on the front and rear sides of the client device. These multiple cameras systems may include a wide camera, an ultra-wide camera, a telephoto camera, a macro camera and a depth sensor, for example.

The position components 436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 402 further include communication components 438 operable to couple the machine 400 to a network 422 or devices 424 via respective coupling or connections. For example, the communication components 438 may include a network interface Component or another suitable device to interface with the network 422. In further examples, the communication components 438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 424 may be another machine or any of a wide variety of peripheral devices (e.g., a peripheral device coupled via a USB).

Moreover, the communication components 438 may detect identifiers or include components operable to detect identifiers. For example, the communication components 438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 438, such as location via Internet Protocol (IP) geolocation, location via Wi-Fi® signal triangulation, location via detecting an NFC beacon signal that may indicate a particular location, and so forth.

The various memories (e.g., main memory 414, static memory 416, and memory of the processors 404) and storage unit 418 may store one or more sets of instructions and data structures (e.g., software) embodying or used by any one or more of the methodologies or functions described herein. These instructions (e.g., the instructions 410), when executed by processors 404, cause various operations to implement the disclosed examples.

The instructions 410 may be transmitted or received over the network 422, using a transmission medium, via a network interface device (e.g., a network interface component included in the communication components 438) and using any one of several well-known transfer protocols (e.g., hypertext transfer protocol (HTTP)). Similarly, the instructions 410 may be transmitted or received using a transmission medium via a coupling (e.g., a peer-to-peer coupling) to the devices 424.

Software Architecture

Figure 5:
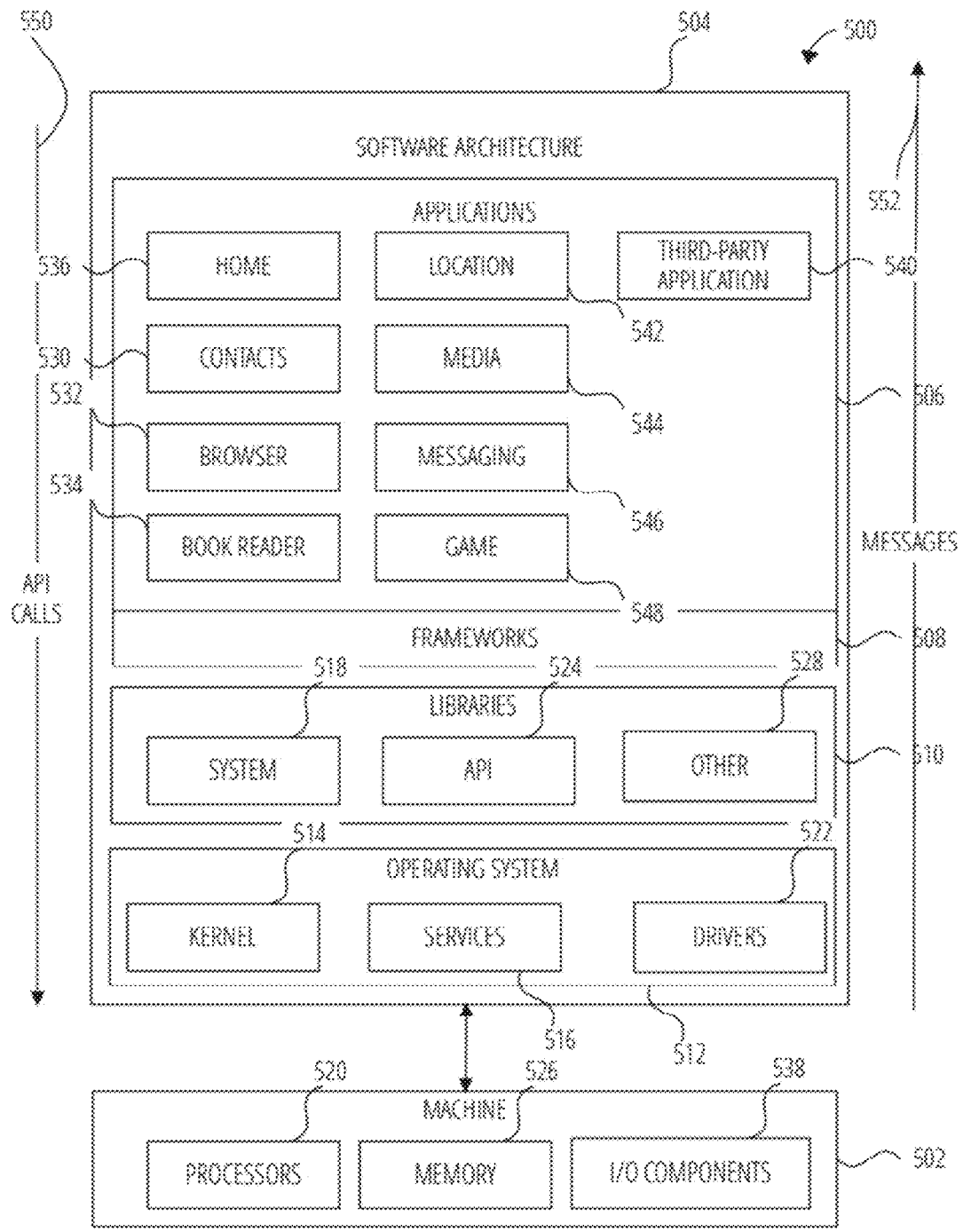
FIG. 5 is a block diagram showing a software architecture within which examples may be implemented.

FIG. 5 is a block diagram 500 illustrating a software architecture 504, which can be installed on any one or more of the devices described herein. The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionality. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540. The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. An apparatus comprising:
   a camera;
   a camera opening that couples to a camera lens of the camera; and
   a viewfinder collocated with the camera opening, the viewfinder comprising a mirror coupled to an aperture having a width and a height, the mirror being recessed into the apparatus at a depth defined by a height of the aperture;
   the width and the height of the aperture being based on a field of view of the camera,
   the viewfinder having a field of view that approximates the field of view of the camera for a range of viewing angles at which a user can view the mirror to preview a picture of the user taken by the camera in self-portrait mode, wherein the apparatus is a housing case that is configured to be coupled to a client device, wherein the camera of the apparatus is separate from the client device.

2. The apparatus of claim 1, wherein the apparatus is shaped to be coupled to a rear face of the client device.

3. The apparatus of claim 1, wherein a rear face of the client device is coupled to a face of the apparatus having the camera opening.

4. The apparatus of claim 1, wherein the client device includes a front camera and a rear camera that are separate from the camera of the apparatus.

5. The apparatus of claim 1, wherein the mirror is coupled to an inside of the aperture.

6. The apparatus of claim 1, wherein a shape of the mirror is spherical, parabolic, hyperbolic, convex, or defined by a higher number polynomial.

7. The apparatus of claim 1, wherein the range of viewing angles is a range of angles at which a user can view the mirror.

8. The apparatus of claim 1, wherein the range of viewing angles comprises up to 30 degrees in each direction from a center viewpoint of the mirror.

9. The apparatus of claim 1, wherein the viewfinder is located to adjacent to the camera opening.

10. The apparatus of claim 1, wherein the viewfinder is larger in size than the camera opening.

11. The apparatus of claim 1, wherein the aperture limits the range of viewing angles, and prevents the mirror from reflecting at given angles, wherein the field of view of the viewfinder is based on the height and the width of the aperture.

12. An apparatus comprising:
    a camera; and
    a viewfinder collocated with a camera lens of the camera, the viewfinder comprising a mirror coupled to an aperture having a width and a height, the mirror being recessed into the apparatus at a depth defined by a height of the aperture;
    the width and the height of the aperture being based on a field of view of the camera,
    the viewfinder having a field of view that approximates the field of view of the camera for a range of viewing angles at which a user can view the mirror to preview a picture of the user taken by the camera in self-portrait mode, wherein the apparatus is a housing case that is configured to be coupled to a client device, wherein the camera of the apparatus is separate from the client device.

13. The apparatus of claim 12, wherein the apparatus is shaped to be coupled to the client device.

14. The apparatus of claim 12, wherein a rear face of the client device is coupled to a face of the apparatus having the camera opening.

15. The apparatus of claim 12, wherein the client device includes a front camera and a rear camera that are separate from the camera of the apparatus.

16. The apparatus of claim 12, wherein the mirror is coupled to an inside of the aperture.

17. The apparatus of claim 12, wherein a shape of the mirror is spherical, parabolic, hyperbolic, convex, or defined by a higher number polynomial.

18. The apparatus of claim 12, wherein the viewfinder is located to adjacent to the camera opening.

19. The apparatus of claim 12, wherein the aperture limits the range of viewing angles, and prevents the mirror from reflecting at given angles, wherein the field of view of the viewfinder is based on the height and the width of the aperture.

* * * * *